(12) United States Patent
Yano et al.

(10) Patent No.: US 7,990,428 B2
(45) Date of Patent: Aug. 2, 2011

(54) IMAGING DEVICE AND HIGH-RESOLUTION PROCESSING METHOD OF IMAGE

(75) Inventors: Takahiro Yano, Tokyo (JP); Tomoyuki Nakamura, Tokyo (JP); Masatoshi Okutomi, Tokyo (JP); Masao Shimizu, Tokyo (JP)

(73) Assignees: Olympus Corporation, Tokyo (JP); Tokyo Institute of Technology, Tokyo (JP)

( * ) Notice: Subject to any disclaimer, the term of this patent is extended or adjusted under 35 U.S.C. 154(b) by 973 days.

(21) Appl. No.: 11/667,766

(22) PCT Filed: Nov. 15, 2005

(86) PCT No.: PCT/JP2005/021312
§ 371 (c)(1),
(2), (4) Date: May 15, 2007

(87) PCT Pub. No.: WO2006/052029
PCT Pub. Date: May 18, 2006

(65) Prior Publication Data
US 2010/0253796 A1    Oct. 7, 2010

(30) Foreign Application Priority Data

Nov. 15, 2004  (JP) ................................. 2004-330253

(51) Int. Cl.
*H04N 5/228*  (2006.01)
(52) U.S. Cl. ................. 348/222.1; 348/208.13

(58) Field of Classification Search ............... 348/207.1, 348/208.13, 222.1
See application file for complete search history.

(56) References Cited

U.S. PATENT DOCUMENTS

| 5,696,848 | A * | 12/1997 | Patti et al. ..................... 382/254 |
| 6,804,419 | B1  | 10/2004 | Miyake |
| 7,352,919 | B2* | 4/2008  | Zhou et al. .................... 382/299 |
| 2003/0193567 | A1* | 10/2003 | Hubel ........................ 348/207.1 |
| 2006/0012830 | A1* | 1/2006  | Aiso ............................ 358/3.27 |

FOREIGN PATENT DOCUMENTS

| EP | 1 001 374 | 5/2000 |
| JP | 10-069537 | 3/1998 |
| JP | 2000-244851 | 9/2000 |
| JP | 2006-033062 | 2/2006 |

* cited by examiner

*Primary Examiner* — Gevell Selby
(74) *Attorney, Agent, or Firm* — Wenderoth Lind & Ponack, L.L.P.

(57) ABSTRACT

An optical system, imaging device and high-resolution processing method precisely generate a high-resolution image by using image data with few pixels. The optical system images an optical image in an imaging unit, the imaged image is spatially discretized so as to be sampled and converted into an image signal, thereby being recorded in a recording unit. A timing at which the image is imaged by the imaging unit is recorded in an imaging timing recording unit. A weight coefficient for the image is calculated by a weight calculating unit by utilizing the timing information obtained by the imaging timing recording unit. A high-resolution processing unit generates a high-resolution image by using the weighted information of the image generated by the weight calculating unit.

14 Claims, 10 Drawing Sheets

FIG.10
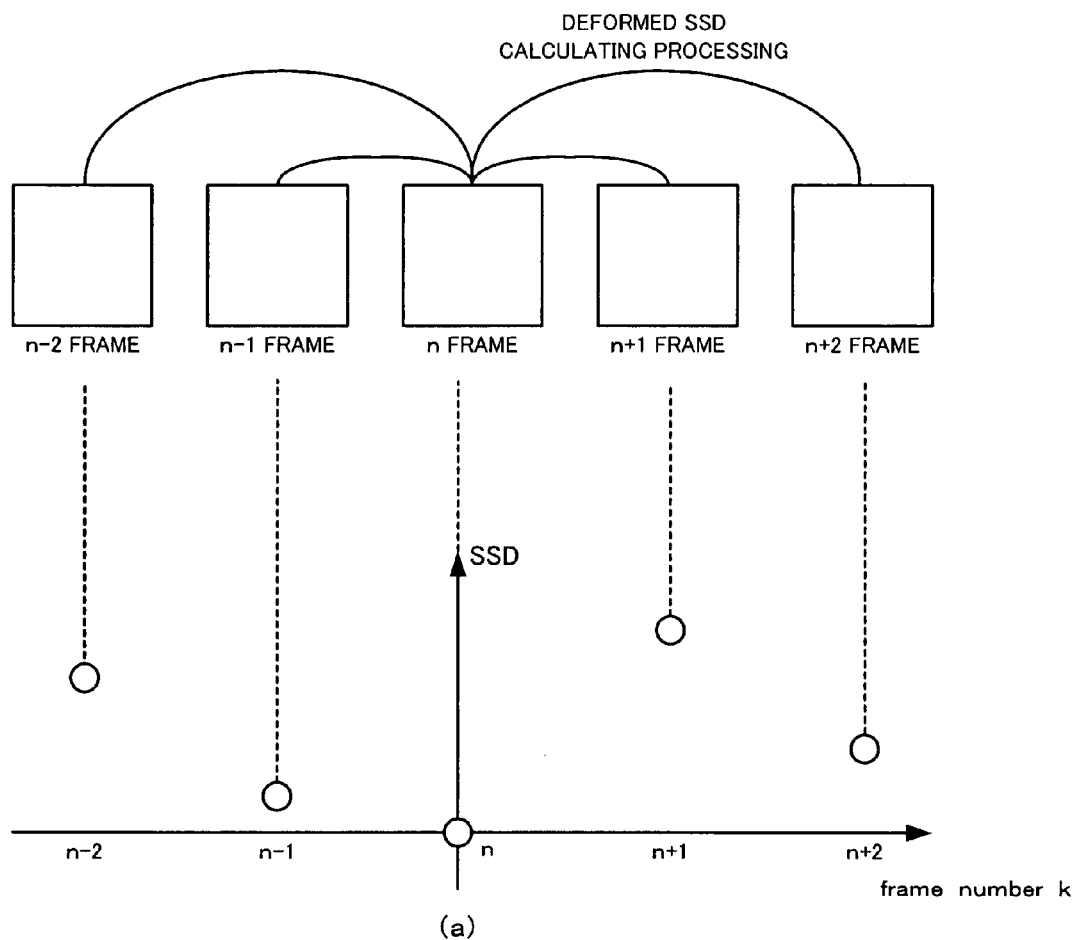
(a)
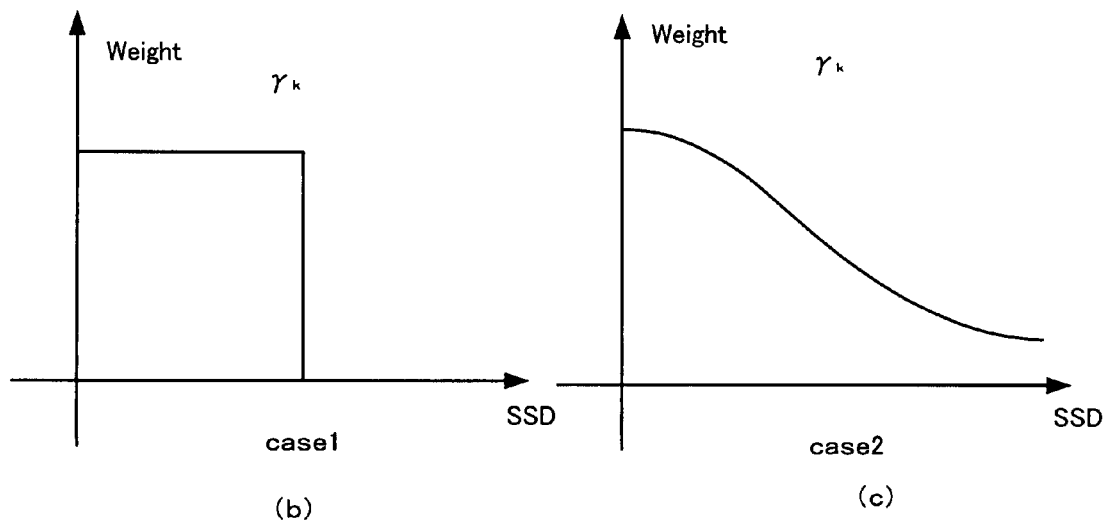
(b)            (c)

IMAGING DEVICE AND HIGH-RESOLUTION PROCESSING METHOD OF IMAGE

BACKGROUND OF THE INVENTION

1. Technical Field

The present invention relates to an imaging device and a high-resolution processing method of image which generate a high-resolution image by utilizing an image input means with a little number of the pixels.

2. Background Technique

As a method of generating a high-resolution image by using image data with a little number of the pixels, there has been known a method of generating a high-resolution image by using low-resolution images of multiple frames with displacement, for example, by using super-resolution technique as proposed in patent document 1 or the like.

However, in the method disclosed in the patent document 1, in the case of using multiple low-resolution images, a weighting is not executed while taking into consideration an influence in the super-resolution processing of the image. Accordingly, in the case that imaging status of multiple low-resolution images used in the super-resolution processing is improper for the super-resolution processing, there is a problem that estimating precision of the high-resolution image is lowered.

The present invention is made by taking the problem mentioned above into consideration, and an object of the present invention is to provide an imaging device and a high-resolution processing method of image which can improve estimating precision of a high-resolution image by improving a problem that precision of the high-resolution image estimating processing is lowered by an influence of an improper imaging status.

SUMMARY OF THE INVENTION (1). In order to achieve the object mentioned above, an imaging device in accordance with the first aspect of the present invention is characterized by: an imaging device comprising: an imaging means for discretizing and sampling an image of a subject spatially, and then converting it into an image signal; a weighted-information generating means for generating weighted-information of images of multiple frames that are sampled by said imaging means; and a high-resolution processing means for generating a high-resolution image by using said weighted-information of images of multiple frames that is generated by said weighted-information generating means.

The invention (1) corresponds to the first embodiment shown in FIG. 1, the second embodiment shown in FIG. 7, and the third embodiment shown in FIG. 9. In the constitution of the invention (1), an optical system, imaging units 101, 201 and 301 correspond to "imaging means for discretizing and sampling an image of a subject spatially, and then converting it into an image signal". Weight calculating units 104, 204 and 304 correspond to "weighted-information generating means for generating weighted-information of images of multiple frames that are sampled by said imaging means". High-resolution processing units 106, 206 and 306 correspond to "high-resolution processing means for generating a high-resolution image by using said weighted-information of images of multiple frames that is generated by said weighted-information generating means".

The invention (1) generates the high-resolution image from image signals of multiple frames by the high-resolution processing means and weights the data of multiple frames. In accordance with this embodiment, it is possible to generate the high-resolution image precisely by using the image data with a little number of the pixels.

(2). An imaging device in accordance with the second aspect of the present invention is characterized by: an imaging device comprising: an imaging means for discretizing and sampling an image of a subject spatially, and then converting it into an image signal; a time relation memory means for storing a relative time relation between images of multiple frames that are sampled by said imaging means; a position relation calculating means for obtaining a relative position relation, in a higher resolution than a pixel spacing of said imaging means, between said sampled images of multiple frames; a base image determining means for determining a base image that becomes a basis from said images of multiple frames; a weighted-information generating means for generating weighted-information that corresponds to a time relation with said base image determined by said base image determining means per each of said multiple frames by using said relative time relation stored in said time relation memory means; and a high-resolution processing means for generating a high-resolution image by using said weighted-information generated by said weighted-information generating means and said relative position relation between images of multiple frames calculated by said position relation calculating means, and said images of multiple frames.

The invention (2) corresponds to the first embodiment shown in FIG. 1. In this embodiment of the invention (2), the optical system and the imaging unit 101 correspond to "imaging means for discretizing and sampling an image of a subject spatially, and then converting it into an image signal". A recording unit 105 corresponds to "time relation memory means for storing a relative time relation between images of multiple frames that are sampled by said imaging means". A base image selecting unit 108 corresponds to "base image determining means for determining a base image that becomes a basis from said images of multiple frames". A weight calculating unit 104 corresponds to "weighted-information generating means for generating weighted-information that corresponds to a time relation with said base image determined by said base image determining means per each of said multiple frames by using said relative time relation stored in said time relation memory means". A high-resolution processing unit 106 corresponds to "high-resolution processing means for generating a high-resolution image by using said weighted-information generated by said weighted-information generating means and said relative position relation between images of multiple frames calculated by said position relation calculating means, and said images of multiple frames".

The invention (2) is provided with the memory means for storing the relative time relation between images of sampled multiple frames, and is constituted such as to perform a weighting that corresponds to the time relation with the base image per each of the multiple frames. As mentioned above, the invention (2) weights the frame which is far from the frame to be high-resolution processed in such a manner as to reduce the influence of the high-resolution processing, and weights the frame which is close thereto in such a manner as to enhance the influence. In accordance with this embodiment, since it is possible to improve a reduction of precision of the high-resolution image estimating processing by using the frame which is time away from the base image, so as to improve an estimating precision of the high-resolution image, it is possible to correspond to an unconformity of correspondence to the frame which is time away from the base image.

(3). An imaging device in accordance with the third aspect of the present invention is characterized by: an imaging device comprising: an imaging means for discretizing and sampling an image of a subject spatially, and then converting it into an image signal; a position relation calculating means for obtaining a relative position relation, in a higher resolution than a pixel spacing of said imaging means, between said sampled images of multiple frames; a base image determining means for determining a base image that becomes a basis from said images of multiple frames; a weighted-information generating means for generating weighted-information that corresponds to a position relation with said base image per each of said multiple frames by using said relative position relation calculated by said position relation calculating means; and a high-resolution processing means for generating a high-resolution image by using said weighted-information generated by said weighted-information generating means and said relative position relation between images of multiple frames calculated by said position relation calculating means, and said images of multiple frames.

The invention (3) corresponds to the second embodiment shown in FIG. 7. In this embodiment of the invention (3), an optical system and an imaging unit 201 corresponds to "imaging means for discretizing and sampling an image of a subject spatially, and then converting it into an image signal". A position estimating unit 202 corresponds to "position relation calculating means for obtaining a relative position relation between said images of multiple frames that are sampled by said imaging means in a higher resolution than a pixel spacing of said imaging means". A base image selecting unit 207 corresponds to "base image determining means for determining a base image that becomes a basis from said images of multiple frames". A weight calculating unit 204 corresponds to " weighted-information generating means for generating weighted-information that corresponds to a position relation with said base image per each of said multiple frames by using said relative position relation calculated by said position relation calculating means". The high-resolution processing unit 106 corresponds to "high-resolution processing means for generating a high-resolution image by using said weighted-information generated by said weighted-information generating means and said relative position relation between images of multiple frames calculated by said position relation calculating means, and said images of multiple frames".

The invention (3) is provided with the means for obtaining a relative position relation between said images of multiple frames that are sampled by said imaging means in a higher resolution than a pixel spacing, and is constituted such as to perform a weighting that corresponds to the position relation with the base image per each of the multiple frames. The weight calculating unit 204 weights the low-resolution image in which a relative dispersion of multiple low-resolution images used for the high-resolution processing in such a manner as to enhance the influence of the high-resolution processing, as described in FIG. 8. In accordance with this embodiment, it is possible to improve a reduction of the precision of the high-resolution image estimating processing, caused by a deviation of the position of the subject image with respect to the base image.

(4). An imaging device in accordance with the fourth aspect of the present invention is characterized by: an imaging device comprising: an imaging means for discretizing and sampling an image of a subject spatially, and then converting it into an image signal; a position relation calculating means for obtaining a relative position relation, in a higher resolution than a pixel spacing of said imaging means, between said sampled images of multiple frames; a base image determining means for determining a base image that becomes a basis from said images of multiple frames; a similarity calculating means for calculating a similarity between said base image and said image of per each of said multiple frames by using said relative position relation obtained by said position relation calculating means; a weighted-information generating means for generating weighted-information that corresponds to said similarity calculated by said similarity calculating means per each of said multiple frames; and a high-resolution processing means for generating a high-resolution image by using said weighted-information generated by said weighted-information generating means and said relative position relation between images of multiple frames calculated by said position relation calculating means, and said images of multiple frames.

The invention (4) corresponds to the third embodiment shown in FIG. 9. In this embodiment of the invention (4), an optical system and an imaging unit 301 correspond to "imaging means for discretizing and sampling an image of a subject spatially, and then converting it into an image signal". An imaging position estimating unit 302 corresponds to "position relation calculating means for obtaining a relative position relation between said images of multiple frames that are sampled by said imaging means in a higher resolution than a pixel spacing of said imaging means". A base image selecting unit 307 corresponds to "base image determining means for determining a base image that becomes a basis from said images of multiple frames". A weight calculating unit 304 corresponds to "similarity calculating means for calculating a similarity between said base image and said image of per each of said multiple frames by using said relative position relation obtained by said position relation calculating means" and "weighted-information generating means for generating weighted-information that corresponds to said similarity calculated by said similarity calculating means per each of said multiple frames". The weight calculating unit 304 weights more heavily in the image high-resolution processing in accordance that a motion estimating precision is higher, as described in FIG. 10. A high-resolution processing unit 306 corresponds to "a high-resolution processing means for generating a high-resolution image by using said weighted-information generated by said weighted-information generating means and said relative position relation between images of multiple frames calculated by said position relation calculating means, and said images of multiple frames".

The invention (4) is constituted such as to obtain the relative position relation between the sampled images of multiple frames in the higher resolution than the pixel spacing, calculate the similarity between the base image obtained by using the obtained relative position relation and the image of per each of the multiple frames, and weight in correspondence to the similarity to the base image calculated per each of the images. In accordance with this embodiment, it is possible to improve the reduction of the precision of the high-resolution image estimating processing, caused by using the frame having the low estimating precision of the position relation of the subject image with respect to the base image, and it is possible to improve the estimating precision of the high-resolution image.

(5). A high-resolution processing method of image in accordance with the first aspect of the present invention is characterized by: a high-resolution processing method of image, comprising: an optical imaging step of imaging an image of a subject; a step of discretizing and sampling said image imaged optically spatially, and then converting it into an image signal; a weighted-information generating step of generating weighted-information of said images of multiple frames that are sampled; and a high-resolution processing step of generating a high-resolution image by using said weighted-information.

The invention (5) corresponds to the first embodiment shown in FIG. 1, the second embodiment shown in FIG. 7 and the third embodiment shown in FIG. 9. The invention (5) is provided with "optical imaging step of imaging an image of a subject" executed by the optical system, and "step of discretizing and sampling said image imaged optically spatially, and then converting it into an image signal" executed by the imaging units 101, 201 and 301. Further, the invention (5) is provided with "weighted-information generating step of generating weighted-information of said images of multiple frames that are sampled" executed by the weight calculating units 104, 204 and 304, and "high-resolution processing step of generating a high-resolution image by using said weighted-information" executed by the high-resolution processing units 106, 206 and 306. Since the high-resolution processing method of image in accordance with the invention (5) is provided with each of the steps mentioned above, it is possible to provide a method of precisely generating the high-resolution image by using the image data with a little number of the pixels.

(6). A high-resolution processing method of image in accordance with the second aspect of the present invention is characterized by: a high-resolution processing method of image, comprising: an optical imaging step of imaging an image of a subject; a step of discretizing and sampling said image imaged optically spatially, and then converting it into an image signal; a time relation memory step of storing a relative time relation between images of multiple frames that are sampled; a position relation calculating step of obtaining a relative position relation, in a higher resolution than a pixel spacing of said imaging means, between said sampled images of multiple frames; a base image determining step of determining a base image that becomes a basis from said images of multiple frames; a weighted-information generating step of generating weighted-information that corresponds to a time relation with said base image per each of said multiple frames by using said stored relative time relation; and a high-resolution processing step of generating a high-resolution image from said weighted-information, said relative position relation and said images of multiple frames.

The invention (6) corresponds to the first embodiment shown in FIG. 1. The invention (6) is provided with "optical imaging step of imaging an image of a subject" executed by the optical system, and "step of discretizing and sampling said image imaged optically spatially, and then converting it into an image signal" executed by the imaging unit 101. Further, the invention (6) is provided with "time relation memory step of storing a relative time relation between images of multiple frames that are sampled" executed by the recording unit 105, "a base image determining step of determining a base image that becomes a basis from said images of multiple frames" executed by a base image selecting unit 108, "weighted-information generating step of generating weighted-information that corresponds to a time relation with said base image per each of said multiple frames by using said stored relative time relation" executed by the weight calculating unit 104, and "high-resolution processing step of generating a high-resolution image from said weighted-information, said relative position relation and said images of multiple frames" executed by the high-resolution processing unit 106.

Since the high-resolution processing method of image in accordance with the invention (6) is provided with each of the steps mentioned above, it is possible to provide a method corresponding to an unconformity of the correspondence to the frame which is time away from the base image, by weighting the frame which is far from the frame to be high-resolution processed in such a manner as to reduce the influence of the high-resolution processing, and weighting the frame which is close thereto in such a manner as to enhance the influence.

(7). A high-resolution processing method of image in accordance with the third aspect of the present invention is characterized by: a high-resolution processing method of image, comprising: an optical imaging step of imaging an image of a subject; a step of discretizing and sampling said image imaged optically spatially, and then converting it into an image signal; position relation calculating step of obtaining a relative position relation between said images of multiple frames that are sampled in a higher resolution than a pixel spacing that was sampled; a base image determining step of determining a base image that becomes a basis from said images of multiple frames; a weighted-information generating step of generating weighted-information that corresponds to a position relation with said base image per each of said multiple frames by using said relative position relation; and a high-resolution processing step of generating a high-resolution image from said weighted-information, said relative position relation and said images of multiple frames.

The invention (7) corresponds to the second embodiment shown in FIG. 7. The invention (7) is provided with "optical imaging step of imaging an image of a subject" executed by the optical system, and "step of discretizing and sampling said image imaged optically spatially, and then converting it into an image signal" executed by the imaging unit 201. Further, the invention (7) is provided with "position relation calculating step of obtaining a relative position relation between said images of multiple frames that are sampled in a higher resolution than a pixel spacing that was sampled" executed by the position estimating unit 202, "base image determining step of determining a base image that becomes a basis from said images of multiple frames" executed by a base image selecting unit 207, "weighted-information generating step of generating weighted-information that corresponds to a position relation with said base image per each of said multiple frames by using said relative position relation" executed by the weight calculating unit 204, and "high-resolution processing step of generating a high-resolution image from said weighted-information, said relative position relation and said images of multiple frames" executed by the high-resolution processing unit 206.

Since the high-resolution processing method of image in accordance with the invention (7) is provided with each of the steps mentioned above, it is possible to obtain the relative position relation between the sampled images of multiple frames in the higher resolution than the pixel spacing, and it is possible to weight in correspondence to the position relation to the base image per each of the multiple frames. The processing executed by the weight calculating unit 204, weights the low-resolution image in which the relative dispersion of multiple low-resolution images used for the high-resolution processing is enlarged, in such a manner as to enhance the influence of the high-resolution processing, as described in FIG. 8. It is possible to provide a method capable of corresponding to the reduction of the precision of the high-resolution image estimating processing caused by the deviation of the positions of the subject images with respect to the base image, by executing the processes mentioned above.

(8). A high-resolution processing method of image in accordance with the fourth aspect of the present invention is characterized by: a high-resolution processing method of image, comprising: an optical imaging step of imaging an image of a subject; a step of discretizing and sampling said image imaged optically spatially, and then converting it into an image signal; a position relation calculating step of obtaining a relative position relation, in a higher resolution than a pixel spacing of said imaging means, between said sampled images of multiple frames; a base image determining step of determining a base image that becomes a basis from said images of multiple frames; a similarity calculating step of calculating a similarity between said base image and said image of per each of said multiple frames by using said relative position relation; a weighted-information generating step of generating weighted-information that corresponds to said similarity per each of said multiple frames; and a high-resolution processing step of generating a high-resolution image from said weighted-information, said relative position relation and said images of multiple frames.

The invention (8) corresponds to the third embodiment shown in FIG. 9. The invention (8) is provided with "optical imaging step of imaging an image of a subject" executed by the optical system, and "step of discretizing and sampling said image imaged optically spatially, and then converting it into an image signal" executed by the imaging unit 301. Further, the invention (8) is provided with "position relation calculating step of obtaining a relative position relation between said images of multiple frames that are sampled in a higher resolution than a pixel spacing that was sampled" executed by the imaging position estimating unit 302, "base image determining step of determining a base image that becomes a basis from said images of multiple frames" executed by the base image selecting unit 307, "similarity calculating step of calculating a similarity between said base image and said image of per each of said multiple frames by using said relative position relation" and "weighted-information generating step of generating weighted-information that corresponds to said similarity per each of said multiple frames" executed by the weight calculating unit 304, and "high-resolution processing step of generating a high-resolution image from said weighted-information, said relative position relation and said images of multiple frames" executed by the high-resolution processing unit 306.

Since the high-resolution processing method of image in accordance with the invention (8) is provided with each of the steps mentioned above, it is possible to obtain the relative position relation between the sampled images of multiple frames in the higher resolution than the pixel spacing, it is possible to calculate the similarity between the base image obtained by using the obtained relative position relation and the image of per each of the multiple frames, and it is possible to weight in correspondence to the similarity to the base image calculated per each of the multiple frames. As mentioned above, since the similarity between the images is obtained on the basis of the position relation estimated between the image to be high-resolution processed and the low-resolution image, and the weighting is executed more heavily in accordance that the similarity is higher, it is possible to provide a method capable of corresponding to the reduction of the estimating precision of the high-resolution image caused by the inconformity of correspondence with respect to the frame in which the estimating precision of the position relation of the subject image is lower than the base image.

(9). A high-resolution processing method of image in accordance with any one of the first to fourth aspects of the present invention is characterized by: wherein said position relation calculating step comprising: a step of generating multiple image sequences by deforming said base image with multiple motions; a step of reading a reference image executing motion estimation between said base image and itself from each of said images of multiple frames; a step of calculating each of similarity values with said multiple image sequences and said reference image; a step of generating a similarity map by using a relation between parameters of deformation motion for generating said multiple image sequences and each of said calculated similarity values; a step of obtaining an extreme value of similarity by using said generated similarity map; and a step of specifying a deformation motion with said obtained extreme value of similarity.

The invention (9) corresponds to the first embodiment shown in FIG. 3. A step S2 corresponds to "step of generating multiple image sequences by deforming said base image with multiple motions", a step S3 corresponds to "step of reading a reference image executing motion estimation between said base image and itself from each of said images of multiple frames", a step S4 corresponds to "step of calculating each of similarity values with said multiple image sequences and said reference image", a step S5 corresponds to "step of generating a similarity map by using a relation between parameters of deformation motion for generating said multiple image sequences and each of said calculated similarity values", and a step S6 corresponds to "step of obtaining an extreme value of similarity by using said generated similarity map", and "step of specifying a deformation motion with said obtained extreme value of similarity".

Since the high-resolution processing method of image in accordance with the invention (9) is provided with each of the steps mentioned above, it is possible to precisely execute the motion estimation by using the image data with a little number of the pixels.

(10). A high-resolution processing method of image in accordance with any one of the first to fourth aspects of the present invention is characterized by: wherein said high-resolution processing step comprising: a step of performing minimization of an evaluation function by using a point spread function of an imaging image that takes an imaging characteristic into consideration, and said calculated position relation.

The invention (10) corresponds to the first embodiment shown in FIG. 5. A step S15 corresponds to "step of performing minimization of an evaluation function by using a point spread function of an imaging image that takes an imaging characteristic into consideration, and said calculated position relation" in the invention (10). Since the high-resolution processing method of image in accordance with the invention (10) is provided with the step mentioned above, it is possible to smoothly convert the read low-resolution image into the high-resolution image.

BRIEF DESCRIPTION OF THE DRAWINGS

FIG. 10 is an explanatory view showing an example of a weighting calculation.

DETAILED DESCRIPTION OF THE INVENTION

Figure 1:
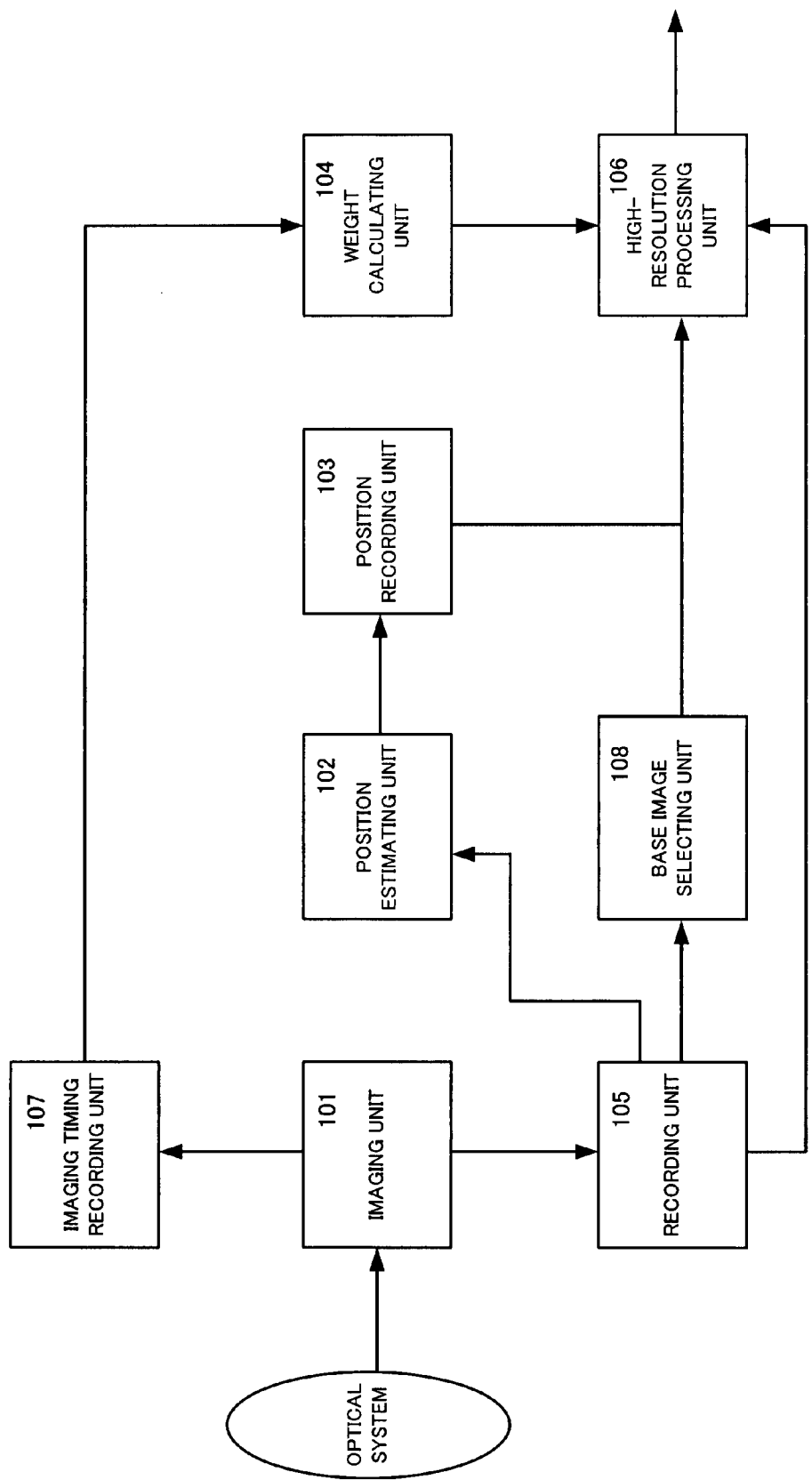
FIG. 1 is a schematic view showing the first embodiment in accordance with the present invention.

A description will be given below of embodiments in accordance with the present invention with reference to the accompanying drawings. FIG. 1 is a schematic view of the first embodiment. In this case, a description will be given of super-resolution processing associated with image processing in accordance with the present invention. The super-resolution processing is a method of photographing multiple images with displacement in sub-pixel level and synthesizing these images after canceling a deterioration factor of an optical system or the like of these images.

In FIG. 1, the optical system images an optical image on an imaging unit 101. The image imaged on the imaging unit 101 is spatially discretized and sampled, and then is converted into an image signal so as to be recorded in a recording unit 105. Further, a timing at which the image is imaged by the imaging unit 101 is recorded in an imaging timing recording unit 107. A weight coefficient for the imaged image is calculated by a weight calculating unit 104 by utilizing the timing information obtained by the imaging timing recording unit 107.

Figure 2:
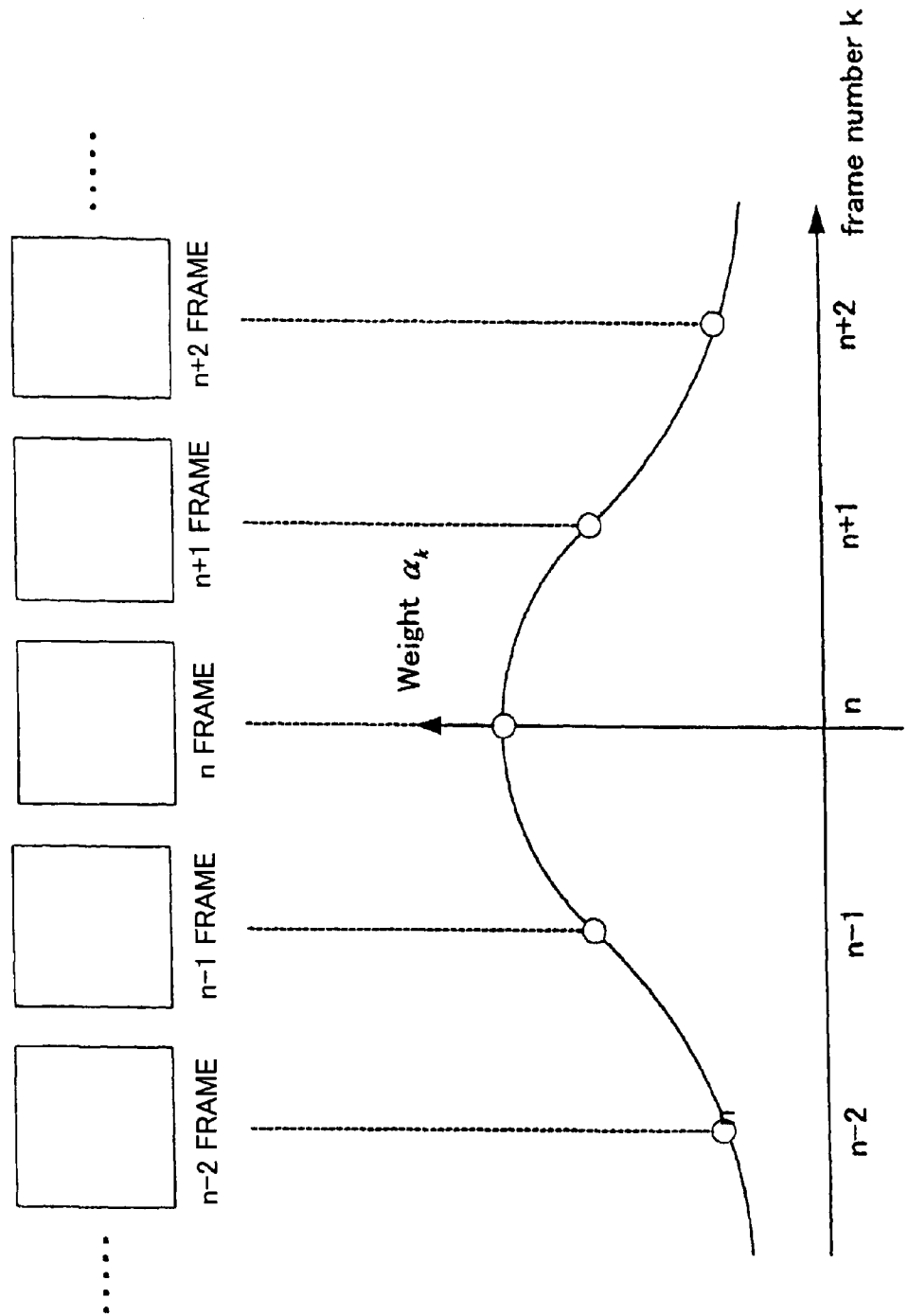
FIG. 2 is an explanatory view showing an example of a weighting calculation.

FIG. 2 is an explanatory view showing an example of a weighting. A description will be given below of an example of the weighting calculation executed by the weight calculating unit 104 by using FIG. 2. In FIG. 2, there is shown a weight coefficient $\alpha_k$ with respect to the image in an order of respective frames. In the case of performing the high-resolution processing of n-th frame of the imaged low-resolution images, it is necessary to more heavily weight the frame closer to the n-th frame at a time of the high-resolution image processing. As a method of weighting more heavily the frame which is closer to the n-th frame, there can be considered a method of weighting a frame having a threshold value or less at a constant level, a method of changing a weight in a Gauss distribution manner (refer to FIG. 2) and the like. The weight coefficient obtained by this method can be expressed by $\alpha_k$ in the following Expression 1, in the case of being expressed within an expression of the high-resolution processing method.

$$f(z) = \sum_k \{\alpha_k \|y_k - A_k z\|^2 + \lambda g(z)\} \quad \text{[Expression 1]}$$

In this case, reference symbol f(z) denotes an image high-resolution processing evaluation function, reference symbol $y_k$ denotes a low-resolution image, reference symbol $A_k$ denotes an image transformation matrix which considered an imaging system, reference symbol z denotes a high-resolution image, reference symbol $\lambda$ denotes a weight coefficient, reference symbol g(z) denotes a constraint term which considered prior information such as smoothness of the image, color difference signal or the like.

In FIG. 1, an image that becomes a basis, is selected by a base image selecting unit 108 from the image data transmitted from the imaging unit 101 and recorded in the recording unit 105. Position estimation of the base image selected by the base image selecting unit 108, and the other images is executed by a position estimating unit 102, and a result of position estimation is recorded in a position recording unit 103.

Figure 3:
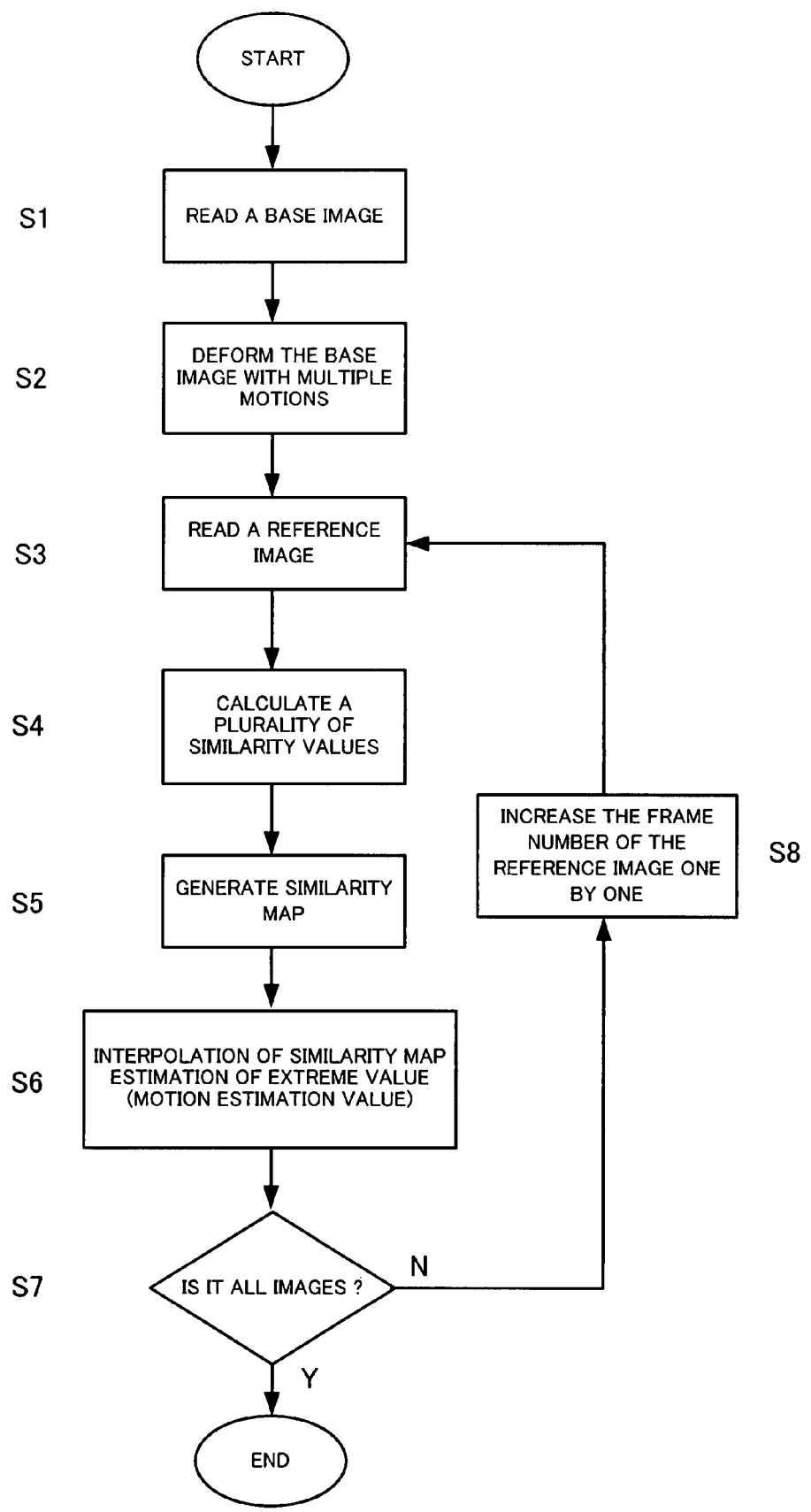
FIG. 3 is a flow chart showing an example of motion estimating algorithm.

Details of algorithm of motion estimation in the first embodiment is shown in a flow chart of FIG. 3. A description will be given below by the flow chart along a flow of the algorithm. S1: read one image which becomes a basis of the motion estimation and define this image as a base image. S2: generate an image sequence by deforming the base image with multiple motions. S3: read one reference image which is used for performing the motion estimation between the base image and itself. S4: calculate a plurality of similarity values between the image sequence obtained by deforming the base image with multiple motions and the reference image. S5: generate a discrete similarity map by utilizing a relation between the parameter of deformation motion and calculated similarity value.

S6: obtain an extreme value of the continuous similarity values which are generated by interpolating the discrete similarity map generated in S5. The deformation motion with the extreme value becomes an estimated motion. As a search method of the extreme value of the continuous similarity values, there are parabola fitting, spline interpolation method and the like. S7: determine whether or not the motion estimation is performed for all reference images. S8: in the case that the motion estimation is not performed for all reference images, the step goes back to S3 by increasing the frame number of the reference image one by one, and continues a reading processing of the next image. The motion estimation is performed for all reference images which become an object, and the processing is finished if the result of determination in S7 comes to "Y".

Figure 4:
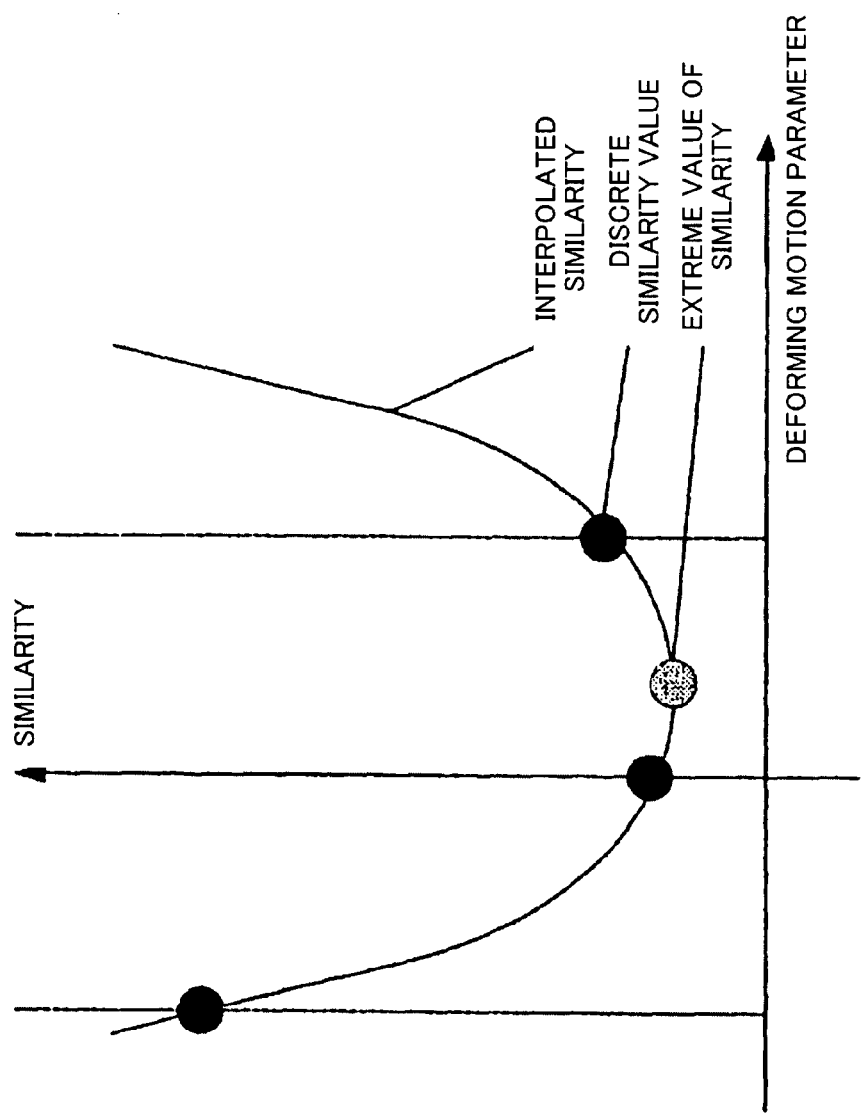
FIG. 4 is an explanatory view of an example in which motion estimation is executed in accordance with parabola fitting.

FIG. 4 is an explanatory view showing an example in which the motion estimation is executed in accordance with parabola fitting. A vertical axis of FIG. 4 indicates a similarity, and the smaller the value is, the higher the similarity is. A black circle of FIG. 4 indicates a discrete similarity value, and a gray circle indicates an extreme value of the similarity. A curve connecting the discrete similarity values comes to an interpolated similarity. Turning back to the constitution of FIG. 1, an image high-resolution processing for a base image is executed in a high-resolution processing unit 106, by using a weight coefficient obtained by the weight calculating unit 104, a position estimating amount between the images recorded in the position recording unit 103, image data recorded in the recording unit 105, and base image information obtained by the base image selecting unit 108.

Figure 5:
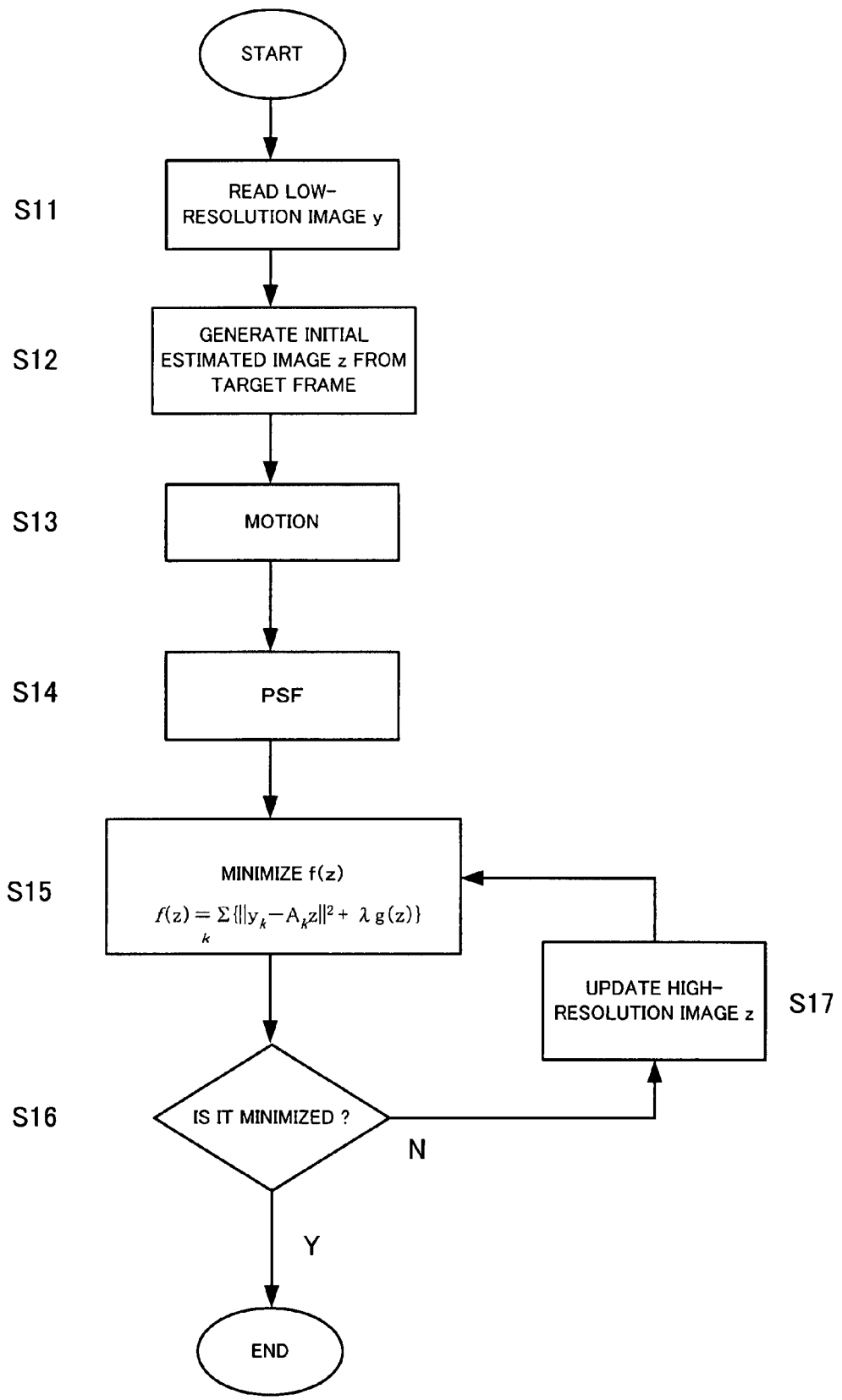
FIG. 5 is a flow chart showing an example of image high-resolution processing.

An algorithm of the embodiment of the image high-resolution processing is shown in a flow chart of FIG. 5. S11: read n number of low-resolution images for using in the high-resolution image estimation (where, n≧1). S12: generate an initial high-resolution image by assuming one arbitrary image of multiple low-resolution images as a target frame and performing an interpolation processing. This step can be omitted as the case may be. S13: clarify a position relation between the images on the basis of the motion between the target frame and the other frames of images, which is previously determined in accordance with some kind or another motion estimating method. S14: obtain a point spread function (PSF) which considered an imaging characteristic such as an optical transfer function (OTF), a CCD aperture or the like. The PSF utilizes, for example, a Gauss function. S15: minimize an evaluation function f(z) on the basis of the infor mation of S13 and S14. In this case, f(z) is expressed by the following Expression 2.

$$f(z) = \sum_k \{\|y_k - A_k z\|^2 + \lambda g(z)\}$$ [Expression 2]

In this case, reference symbol $y_k$ denotes a low-resolution image, reference symbol z denotes a high-resolution image, and reference symbol $A_k$ denotes an image transformation matrix that represents an imaging system including motion between images, the PSF and the like. Reference symbol g(z) denotes a constraint term which considered prior information such as smoothness of the image, color difference signal or the like. Reference symbol λ denotes a weight coefficient. In order to minimize the evaluation function, for example, steepest descent method is employed. S16: determine whether or not f(z) computed in S15 is minimized. In the case that f(z) is minimized, the high-resolution image z is obtained by finishing the process. S17: in the case that f(z) is not minimized yet, the step goes back to S13 by updating the high-resolution image z.

Figure 6:
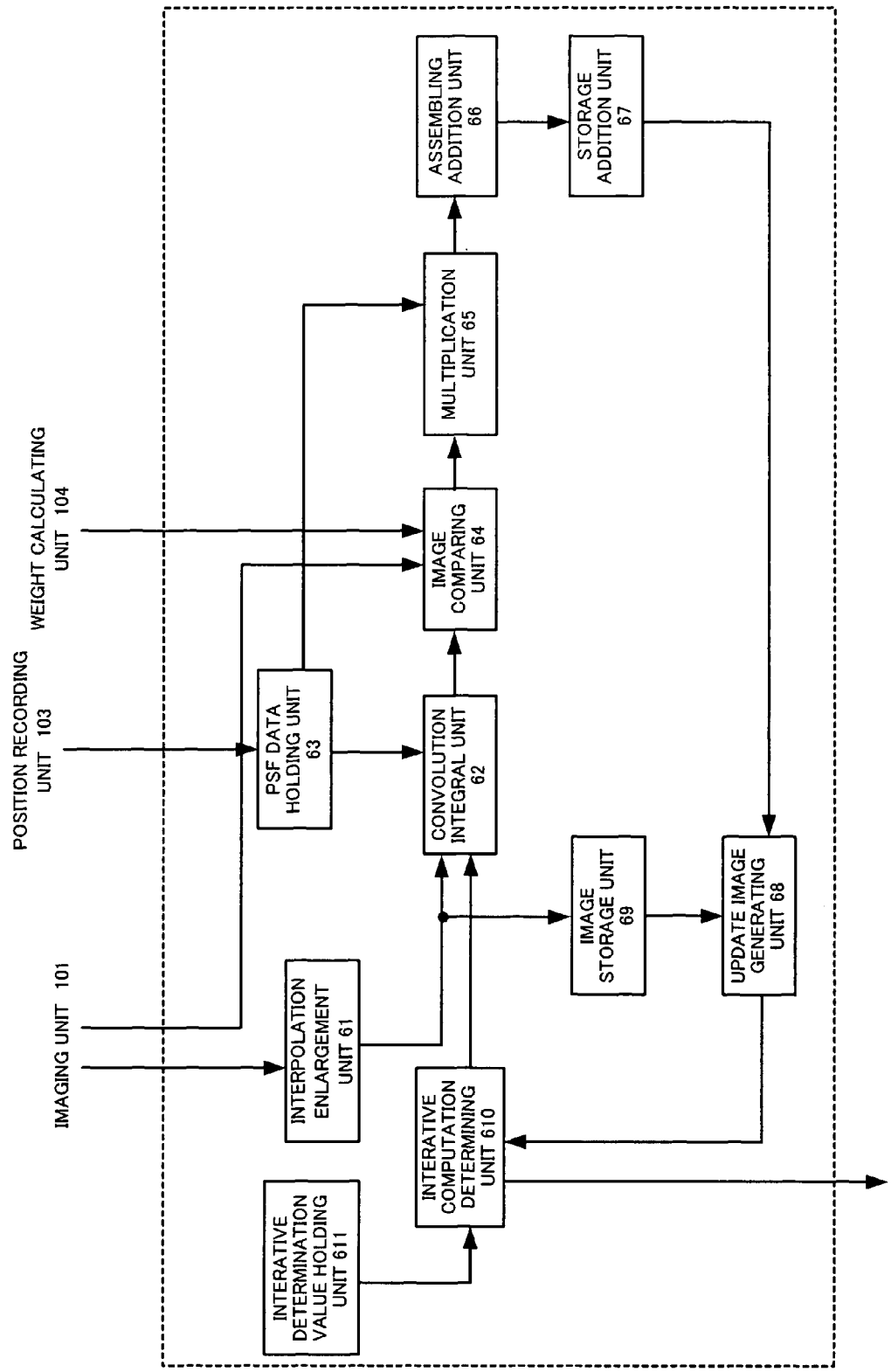
FIG. 6 is a schematic view showing an example of a constitution at a time of executing an algorithm.

FIG. 6 is a schematic view showing an example of a constitution at a time of executing the algorithm. As shown in FIG. 6, the high-resolution processing unit 106 described in FIG. 1 is constituted by an interpolation enlargement unit 61, a convolution integral unit 62, a PSF data holding unit 63, an image comparing unit 64, a multiplication unit 65, an assembling addition unit 66, an storage addition unit 67, an update image generating unit 68, an image storage unit 69, an iterative computation determining unit 610, and an iterative determination value holding unit 611.

First, from the imaging unit 101, one arbitrary image data from image data of multiple frames is transmitted to the interpolation enlargement unit 61, and an interpolation enlargement of the image is executed here. As a method of the interpolation enlargement used here, for example, there can be listed up a general bi-linear interpolation, a bi-cubic interpolation and the like. The interpolated and enlarged image is given to the convolution integral unit 62, and is integrated at a suitable coordinate position while taking into consideration the PSF data given from the PSF data holding unit 63 and the motion of per each of the multiple frames obtained by the motion estimating unit.

The interpolated and enlarged image data is simultaneously transmitted to the image storage unit 69, and is stored here. The convolution computed image data is transmitted to the image comparing unit 64, and is compared with the photographed image given from the imaging unit. A compared residual error is transmitted to the multiplication unit 65, and is multiplied by the value per each of the pixels of the PSF data given from the PSF data holding unit 63.

The result of computation is transmitted to the assembling addition unit 66, and is put at the corresponding coordinate position. In this case, since the image data from the multiplication unit 65 is deviated little by little in the coordinate position while keeping the overlap, the overlapped portion is added. When the assembling addition of the data for one photographed image is finished, the data is transmitted to the storage addition unit 67. The storage addition unit 67 stores the data which is sequentially transmitted until the frame number of processing is finished, and sequentially adds the respective frame of image data in correspondence to the estimated motion.

The added image data is transmitted to the update image generating unit 68. The image data stored in the image storage unit 69 is simultaneously given to the update image generating unit 68, and the update image data is generated by adding these two image data after weighting. The generated update image data is given to the iterative computation determining unit 610, and it is determined whether or not the computation is iterated on the basis of the iterative determining value given from the iterative determination value holding unit 611.

In the case of iterating the computation, the data is transmitted to the convolution integral unit 62 and the series of processing are iterated, and in the case that the computation is not iterated, the generated image data is output. The image output from the iterative computation determining unit 610 comes to the higher resolution image than the photographed image, by executing the series of processing mentioned above. Further, since it is necessary to execute a calculation at a suitable coordinate position at a time of the convolution integral, in the PSF data held by the PSF data holding unit 63, the constitution is made such that the data is given from the weight calculating unit 104.

The description is given above of the imaging device in accordance with the first embodiment with reference to FIGS. 1 to 6. The constitution of FIGS. 1 to 6 can construct the invention of the high-resolution processing method of image. In other words, it is possible to realize the high-resolution processing method of image constituted by "optical imaging step of imaging an image of a subject" executed by the optical system, "step of discretizing and sampling said image imaged optically spatially, and then converting it into an image signal" executed by the imaging unit 101, "time relation memory step of storing a relative time relation between images of multiple frames that are sampled" executed by the recording unit 105, "base image determining step of determining a base image that becomes a basis from said images of multiple frames" executed by a base image selecting unit 108, "weighted-information generating step of generating weighted-information that corresponds to a time relation with said base image determined by said base image determining means per each of said multiple frames by using said relative time relation stored in the time relation memory means" executed by the weight calculating unit 104, and "high-resolution processing step of generating a high-resolution image by using the weighted-information generated by the weighted-information generating means, the relative position relation between the images of multiple frames calculated by the position relation calculating means, and the images of multiple frames" executed by the high-resolution processing unit 106, in FIG. 1.

In accordance with the first embodiment of the present invention described above, it is possible to improve the reduction of the precision of the high-resolution image estimating processing so as to improve the estimating precision of the high-resolution image, by employing the frame which is time away from the base image.

Figure 7:
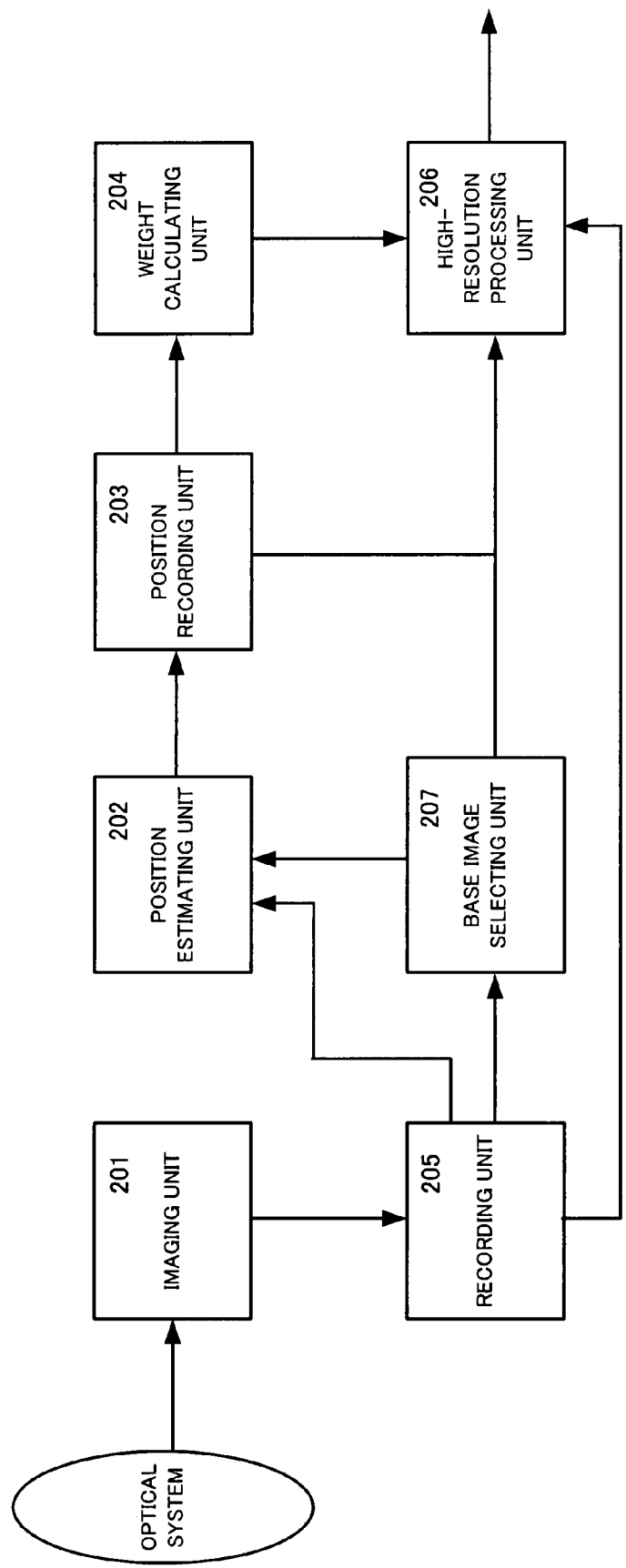
FIG. 7 is a schematic view showing the second embodiment in accordance with the present invention.

FIG. 7 is a schematic view showing a constitution of the second embodiment in accordance with the present invention. An optical system images an optical image on an imaging unit 201, and the imaged image is spatially discretized and sampled, and is converted into an image signal so as to be recorded in a recording unit 205. The image data recorded in the recording unit 205 selects a base image in a base image selecting unit 207. A position estimation between the base image and the other images is executed by a position estimating unit 202, and is recorded in a position recording unit 203. Details of an algorithm of the motion estimation is the same as that used in the first embodiment. A weight coefficient for the imaged image is calculated by a weight calculating unit 204 by utilizing the position estimation information recorded in the position recording unit 203. The position estimating unit 202 serves as a means for determining a relative position relation between the sampled images of multiple frames in a higher resolution than a pixel spacing.

Figure 8:
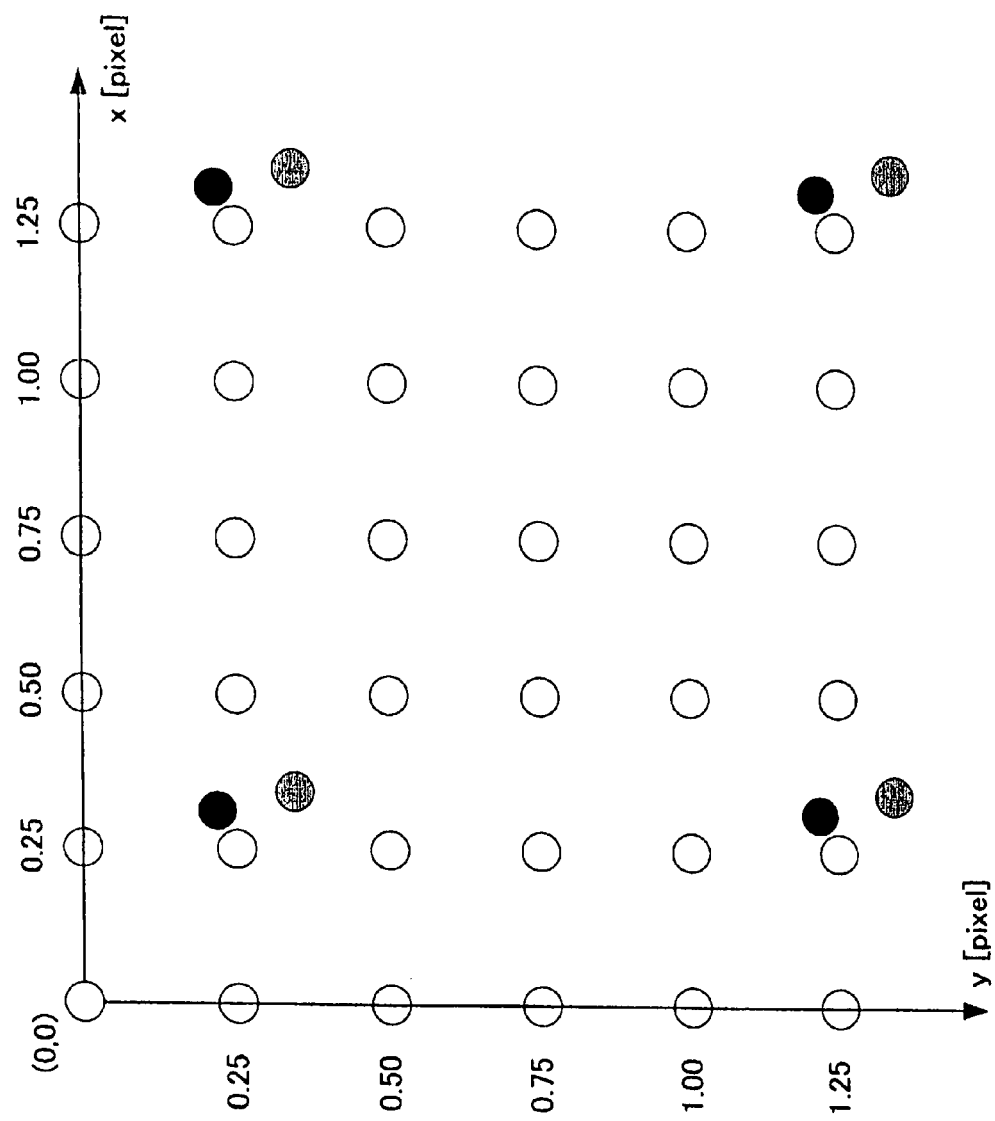
FIG. 8 is an explanatory view showing an example of a weighting calculation.

FIG. 8 is an explanatory view showing an example of a weighting calculation calculated by the weight calculating unit 204. Hereinafter, a description will be given of an example of the weighting calculation executed by the weight calculating unit 204 by using FIG. 8. In the case of executing the image high-resolution processing by using multiple low-resolution images, it is preferable that multiple low-resolution images are not photographed at the similar sub-pixel position, but are sampled with dispersion at the different sub-pixel positions. Accordingly, the weighting is executed in such a manner as to enhance the influence of the low-resolution image sampled with dispersion in the sub-pixel unit, and is used for the image high-resolution processing.

Specifically, the following methods can be considered. It is assumed that the image similar to the dispersion +0.25[pixel] is intended to be used in the low-resolution image coordinate as shown in FIG. 8. In this case, it is preferable to employ an image photographed by a black circle, rather than an image photographed at a gray circle position. In this case, there is specifically executed a method of determining a distance from a position deviated at +0.25 [pixel] to a position of the photographed pixel so as to weight the one having the smaller distance. The weight coefficient determined by this method can be expressed by $\beta_k$ in the following Expression 3, in the case of being expressed within an expression of the high-resolution processing method.

$$f(z) = \sum_k \{\beta_k \|y_k - A_k z\|^2 + \lambda g(z)\} \quad \text{[Expression 3]}$$

In this case, reference symbol f(z) denotes an image high-resolution processing evaluation function, reference symbol $y_k$ denotes a low-resolution image, reference symbol $A_k$ denotes an image transformation matrix that considered an imaging system, reference symbol z denotes a high-resolution image, reference symbol $\lambda$ denotes a weight coefficient, reference symbol g(z) denotes a constraint term which considered prior information such as smoothness of the image, color difference signal or the like.

Next, an image high-resolution processing of the base image is executed in the high-resolution processing unit 206, by using the weight coefficient obtained by the weight calculating unit 204 of FIG. 7, the position estimation amount between the images recorded in the position recording unit 203, the image data recorded in the recording unit 205, and the base image information obtained by the base image selecting unit 207. Details of the image high-resolution processing is the same as that used in the embodiment 1.

The description is given above of the imaging device in accordance with the second embodiment with reference to FIGS. 7 and 8. The constitution of FIGS. 7 and 8 can construct the invention of the high-resolution processing method of image. In other words, it is possible to realize the high-resolution processing method of image constituted by "optical imaging step of imaging an image of a subject" executed by the optical system, "step of discretizing and sampling said image imaged optically spatially, and then converting it into an image signal" executed by the imaging unit 201, "position relation calculating step of obtaining a relative position relation between said images of multiple frames that are sampled in a higher resolution than a pixel spacing that was sampled" executed by the position estimating unit 202, "base image determining step of determining a base image that becomes a basis from said images of multiple frames" executed by a base image selecting unit 207, "weighted-information generating step of generating weighted-information that corresponds to a position relation with said base image per each of said multiple frames by using said relative position relation calculated by said position relation calculating means" executed by the weight calculating unit 204, and "high-resolution processing step of generating a high-resolution image by using the weighted-information generated by the weighted-information generating means, the relative position relation between the images of multiple frames calculated by the position relation calculating means, and the images of multiple frames" executed by the high-resolution processing unit 206, in FIG. 7.

In accordance with the second embodiment of the present invention described above, it is possible to improve the reduction of the precision of the high-resolution image estimating processing on the basis of the deviation of the position of the subject image with respect to the base image, so as to improve the estimating precision of the high-resolution image.

Figure 9:
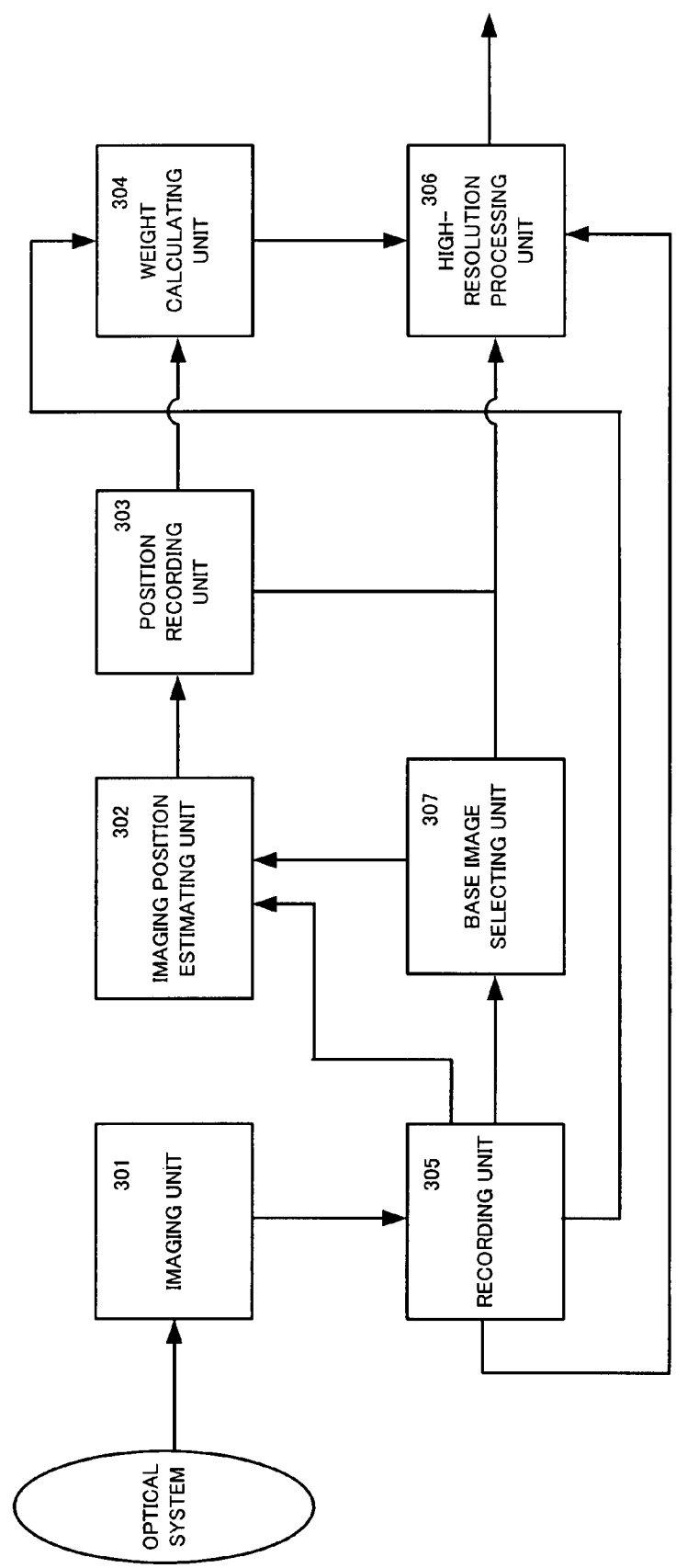
FIG. 9 is a schematic view showing the third embodiment in accordance with the present invention.

FIG. 9 is a schematic view showing a constitution of the third embodiment in accordance with the present invention. An optical system images an optical image on an imaging unit 301, and the imaged image is spatially discretized and sampled, and is converted into an image signal so as to be recorded in a recording unit 305. The image data recorded in the recording unit 305 selects a base image in a base image selecting unit 307. A position estimation between the base image and the other images is executed by an imaged position estimating unit 302, and is recorded in a position recording unit 303. The imaging position estimating unit 302 serves as a means for obtaining a relative position relation between the sampled images of multiple frames in a higher resolution than a pixel spacing.

Details of an algorithm of the motion estimation is the same as that used in the first embodiment. A weight coefficient for the imaged image is calculated by a weight calculating unit 304 by utilizing the position estimation information recorded in the position recording unit 303 and the image data recorded by the recording unit 305.

FIG. 10 is an explanatory view showing an example of a weighting calculation executed by the weight calculating unit 304. A description will be given below by using FIG. 10. The method of calculating the weight by the weight calculating unit 304 is executed as follows. In the case of performing high-resolution processing of n-th frame, motions between n-th frame and the other frames are estimated. At this time, the higher the motion estimating precision is, the more heavily the weighting is executed at a time of the image high-resolution processing.

As an index of motion estimating precision, there is employed a non-similarity evaluation value (SSD, SAD or the like) at a time of registration of the images by the obtained motion estimation value (FIG. 10(a)). The lower the non-similarity evaluation value is, the higher the motion estimation precision is, thereby weighting higher.

The method of weighting on the basis of the non-similarity evaluation value includes a method of weighting constantly the non-similarity equal to or less than a threshold value (case 1 of FIG. 10(b)), a method of changing the weight in a Gauss distribution manner (case 2 of FIG. 10(c)) and the like. The weight coefficient obtained in accordance with this method can be expressed by $\gamma_k$ in the following Expression 4, in the case of being expressed within an expression of the high-resolution processing method.

$$f(z) = \sum_k \{\gamma_k \|y_k - A_k z\|^2 + \lambda g(z)\} \quad \text{[Expression 4]}$$

In this case, reference symbol f(z) denotes an image high-resolution processing evaluation function, reference symbol $y_k$ denotes a low-resolution image, reference symbol $A_k$ denotes an image transformation matrix that considered an imaging system, reference symbol z denotes a high-resolution image, reference symbol λ denotes a weight coefficient, reference symbol g(z) denotes a constraint term which considered prior information such as smoothness of the image, color difference signal or the like.

Next, an image high-resolution processing of the base image is executed in the high-resolution processing unit 306, by using the weight coefficient obtained by the weight calculating unit 304 in FIG. 9, the position estimation amount between the images recorded in the position recording unit 303, the image data recorded in the recording unit 305, and the base image information obtained by the base image selecting unit 307. Details of the image high-resolution processing is the same as that used in the first embodiment.

The description is given above of the imaging device in accordance with the third embodiment with reference to FIGS. 9 and 10. The constitution of FIGS. 9 and 10 can construct the invention of the high-resolution processing method of image. In other words, it is possible to realize the high-resolution processing method of image constituted by "optical imaging step of imaging an image of a subject" executed by the optical system, "step of discretizing and sampling said image imaged optically spatially, and then converting it into an image signal" executed by the imaging unit 301, "position relation calculating step of obtaining a relative position relation between said images of multiple frames that are sampled in a higher resolution than a pixel spacing that was sampled" executed by the imaging position estimating unit 302, "base image determining step of determining a base image that becomes a basis from said images of multiple frames" executed by the base image selecting unit 307, "similarity calculating step of calculating a similarity between said base image and said image of per each of said multiple frames by using said relative position relation" and "weighted-information generating step of generating weighted-information that corresponds to said similarity per each of said multiple frames" executed by the weight calculating unit 304, and "high-resolution processing step of generating a high-resolution image from the weighted information generated by the weighted information generating means, the relative position relation between the images of multiple frames calculated by the position relation calculating means, and the images of multiple frames" executed by the high-resolution processing unit 306, in FIG. 9.

In accordance with the third embodiment of the present invention described above, it is possible to improve the reduction of the precision of the high-resolution image estimating processing caused by using the frame having the low estimating precision of the position relation of the subject image with respect to the base image, so as to improve the estimating precision of the high-resolution image.

In this case, the constitutions described in FIGS. 1, 7 and 9 construct the invention of the high-resolution processing method of image in common. In other words, it is possible to realize the invention of the high-resolution processing method of image constituted by "optical imaging step of imaging an image of a subject" executed by the optical system, "step of discretizing and sampling said image imaged optically spatially, and then converting it into an image signal" executed by the imaging units 101, 201 and 301, "weighted-information generating step of generating weighted-information of said images of multiple frames that are sampled" executed by the weight calculating units 104, 204 and 304, and "high-resolution processing step of generating a high-resolution image by using said weighted-information" executed by the high-resolution processing units 106, 206 and 306.

As described above, in accordance with the present invention, it is possible to provide the imaging device and the high-resolution processing method of image which precisely generate the high-resolution image by using the image data with a little number of the pixels.

Further, in the imaging device and the high-resolution processing method of image in accordance with the present invention, it is possible to improve the reduction of the precision of the high-resolution image estimating processing caused by the great change between multiple low-resolution images used for processing by the photographing status so as to improve the estimating precision of the high-resolution image.

THE LIST OF REFERENCES

Patent Document 1:
Japanese Patent Publication No. H10-69537
What is claimed is:
1. An imaging device, comprising:
an imaging means for discretizing and sampling an image of a subject spatially, and then converting it into an image signal;
a weighted-information generating means for generating weighted-information of images of multiple frames that are sampled by the imaging means; and
a high-resolution processing means for generating a high-resolution image by using the weighted-information of images of multiple frames that is generated by the weighted-information generating means.
2. An imaging device, comprising:
an imaging means for discretizing and sampling an image of a subject spatially, and then converting it into an image signal;
a time relation memory configured to store a relative time relation between images of multiple frames that are sampled by the imaging means;
a position relation calculating means for obtaining a relative position relation, in a higher resolution than a pixel spacing of the imaging means, between the sampled images of multiple frames;
a base image determining means for determining a base image from the images of multiple frames;
a weighted-information generating means for generating weighted-information that corresponds to a time relation with the base image determined by the base image determining means for each of the multiple frames by using the relative time relation stored in the time relation memory; and
a high-resolution processing means for generating a high-resolution image by using the weighted-information generated by the weighted-information generating means and the relative position relation between images of multiple frames calculated by the position relation calculating means, and the images of multiple frames.

3. An imaging device, comprising:
an imaging means for discretizing and sampling an image of a subject spatially, and then converting it into an image signal;
a position relation calculating means for obtaining a relative position relation, in a higher resolution than a pixel spacing of the imaging means, between sampled images of multiple frames;
a base image determining means for determining a base image from the images of multiple frames;
a weighted-information generating means for generating weighted-information that corresponds to a position relation with the base image from the multiple frames by using the relative position relation calculated by the position relation calculating means; and
a high-resolution processing means for generating a high-resolution image by using the weighted-information generated by the weighted-information generating means and the relative position relation between images of multiple frames calculated by the position relation calculating means, and the images of multiple frames.

4. An imaging device, comprising:
an imaging means for discretizing and sampling an image of a subject spatially, and then converting it into an image signal;
a position relation calculating means for obtaining a relative position relation, in a higher resolution than a pixel spacing of the imaging means, between sampled images of multiple frames;
a base image determining means for determining a base image from the images of multiple frames;
a similarity calculating means for calculating a similarity between the base image and the image of each of the multiple frames by using the relative position relation obtained by the position relation calculating means;
a weighted-information generating means for generating weighted-information that corresponds to the similarity calculated by the similarity calculating means for each of the multiple frames; and
a high-resolution processing means for generating a high-resolution image by using the weighted-information generated by the weighted-information generating means and the relative position relation between images of multiple frames calculated by the position relation calculating means, and the images of multiple frames.

5. A high-resolution processing method images, comprising:
an optical imaging step of optically taking an image of a subject;
a step of discretizing and sampling the image spatially, and then converting it into an image signal;
a weighted-information generating step of generating weighted-information of images of multiple frames that are sampled; and
a high-resolution processing step of generating a high-resolution image by using the weighted-information.

6. A high-resolution processing method of images, comprising:
an optical imaging step of optically taking an image of a subject;
a step of discretizing and sampling the image spatially, and then converting it into an image signal using an imaging means;
a time relation memory step of storing a relative time relation between images of multiple frames that are sampled;
a position relation calculating step of obtaining a relative position relation, in a higher resolution than a pixel spacing of the imaging means, between the sampled images of multiple frames;
a base image determining step of determining a base image from the images of multiple frames;
a weighted-information generating step of generating weighted-information that corresponds to a time relation with the base image for each of the multiple frames by using the stored relative time relation; and
a high-resolution processing step of generating a high-resolution image from the weighted-information, the relative position relation and the images of multiple frames.

7. A high-resolution processing method of images according to claim 6, wherein the position relation calculating step further comprises:
generating multiple image sequences by deforming the base image with multiple motions;
reading a reference image executing motion estimation between the base image and the reference image from each of the images of multiple frames;
calculating each of similarity values with the multiple image sequences and the reference image;
generating a similarity map by using a relation between parameters of deformation motion for generating the multiple image sequences and each of the calculated similarity values;
obtaining an extreme value of similarity by using the generated similarity map; and
specifying a deformation motion with the obtained extreme value of similarity.

8. A high-resolution processing method of images according to claim 6, wherein the high-resolution processing step further comprises:
performing minimization of an evaluation function by using a point spread function of an image that takes an imaging characteristic into consideration, and the calculated position relation.

9. A high-resolution processing method of images, comprising:
an optical imaging step of optically taking an image of a subject;
a step of discretizing and sampling the image spatially, and then converting it into an image signal using an imaging means;
a position relation calculating step of obtaining a relative position relation, in a higher resolution than a pixel spacing of the imaging means, between sampled images of multiple frames;
a base image determining step of determining a base image from the images of multiple frames;
a weighted-information generating step of generating weighted-information that corresponds to a position relation with the base image for each of the multiple frames by using the relative position relation; and
a high-resolution processing step of generating a high-resolution image from the weighted-information, the relative position relation and the images of multiple frames.

10. A high-resolution processing method of images according to claim 9, wherein the position relation calculating step further comprises:
generating multiple image sequences by deforming the base image with multiple motions;

reading a reference image executing motion estimation between the base image and the reference image from each of the images of multiple frames;

calculating each of similarity values with the multiple image sequences and the reference image;

generating a similarity map by using a relation between parameters of deformation motion for generating the multiple image sequences and each of the calculated similarity values;

obtaining an extreme value of similarity by using the generated similarity map; and specifying a deformation motion with the obtained extreme value of similarity.

11. A high-resolution processing method of images according to claim 9, wherein the high-resolution processing step further comprises:

performing minimization of an evaluation function by using a point spread function of an image that takes an imaging characteristic into consideration, and the calculated position relation.

12. A high-resolution processing method of images, comprising:

an optical imaging step of optically taking an image of a subject;

a step of discretizing and sampling the image spatially, and then converting it into an image signal using an imaging means;

a position relation calculating step of obtaining a relative position relation, in a higher resolution than a pixel spacing of the imaging means, between sampled images of multiple frames;

a base image determining step of determining a base image from the images of multiple frames;

a similarity calculating step of calculating a similarity between the base image and the image of each of the multiple frames by using the relative position relation;

a weighted-information generating step of generating weighted-information that corresponds to the similarity of each of the multiple frames; and a high-resolution processing step of generating a high-resolution image from the weighted-information, the relative position relation and the images of multiple frames.

13. A high-resolution processing method of images according to claim 12, wherein the position relation calculating step further comprises:

generating multiple image sequences by deforming the base image with multiple motions;

reading a reference image executing motion estimation between the base image and the reference image from each of the images of multiple frames;

calculating each of similarity values with the multiple image sequences and the reference image;

generating a similarity map by using a relation between parameters of deformation motion for generating the multiple image sequences and each of the calculated similarity values;

obtaining an extreme value of similarity by using the generated similarity map; and specifying a deformation motion with the obtained extreme value of similarity.

14. A high-resolution processing method of images according to claim 12, wherein the high-resolution processing step further comprises:

performing minimization of an evaluation function by using a point spread function of an image that takes an imaging characteristic into consideration, and the calculated position relation.

* * * * *